(12) United States Patent
Stedman

(10) Patent No.: US 9,946,976 B2
(45) Date of Patent: Apr. 17, 2018

(54) SYSTEM FOR ENABLING CHANNEL DESIGNATION DIFFERENTIATION FOR HIERARCHICALLY ORGANIZING AND ACCESSING ADDRESS REGISTERS WITH ADDRESS SIGNIFIERS AND ELEMENTS

(71) Applicant: Corey Francis Stedman, White Plains, NY (US)

(72) Inventor: Corey Francis Stedman, White Plains, NY (US)

(*) Notice: Subject to any disclaimer, the term of this patent is extended or adjusted under 35 U.S.C. 154(b) by 199 days.

(21) Appl. No.: 15/174,999

(22) Filed: Jun. 6, 2016

(65) Prior Publication Data

US 2016/0357667 A1    Dec. 8, 2016

Related U.S. Application Data

(60) Provisional application No. 62/171,031, filed on Jun. 4, 2015.

(51) Int. Cl.
| | | |
|---|---|---|
| G06F 15/167 | (2006.01) | |
| G06Q 10/00 | (2012.01) | |
| G06Q 10/10 | (2012.01) | |
| G06Q 30/02 | (2012.01) | |

(52) U.S. Cl.
CPC ........... *G06Q 10/00* (2013.01); *G06Q 10/101* (2013.01); *G06Q 30/0282* (2013.01)

(58) Field of Classification Search
None
See application file for complete search history.

(56) References Cited

U.S. PATENT DOCUMENTS

| | | | |
|---|---|---|---|
| 6,785,704 B1 * | 8/2004 | McCanne | H04L 12/1877 709/201 |
| 2006/0235821 A1 * | 10/2006 | Armangau | G06F 17/30551 |
| 2011/0302213 A1 * | 12/2011 | Noguchi | G06F 17/30067 707/797 |

* cited by examiner

*Primary Examiner* — Kenny S Lin

(57) ABSTRACT

A system of multiple computer systems operating over a network that creates addresses using elements received by users or determined by administrators or supplied by the system based on computer system data, content data, and user data, distinguishes the addresses using address signifiers, organizes the addresses hierarchically, provides access to users by enabling entries that manipulate element inclusion and signifier inclusion, amends entries by adjusting signifier type, and approximates entires with element matching.

20 Claims, 20 Drawing Sheets

SYSTEM FOR ENABLING CHANNEL DESIGNATION DIFFERENTIATION FOR HIERARCHICALLY ORGANIZING AND ACCESSING ADDRESS REGISTERS WITH ADDRESS SIGNIFIERS AND ELEMENTS

PRIORITY CLAIM

This application claims priority to U.S. Provisional Application Ser. No. 62/171,031, filed Jun. 4, 2015. The above references application is incorporated herein by reference as if restated in full.

INTRODUCTION

There are currently no merged hyperlink, channel designation tools using computing division channels and based on a network available that would provide users access to hierarchical channel sorting features. The platform described herein provides a dynamic designation environment in which such features are made available to users. The system includes a first computer system, a second computer system, and a third computer system. The first computer system may comprise a first processor, a first computer storage memory, a first set of one or more input devices, and a first display device. The second computer system may comprise a second processor, a second computer storage memory, a second set of one or more input devices, and a second display device. The third computer system may comprise a third processor and a third computer storage memory. The first computer system may be operated by a content provider user and the second computer system may be operated by a viewing user/consumer, but these rules may overlap or be further divided. The first computer system, the second computer system, and the third computer system are connected to a network of one or more computer systems.

The third processor may be programmed to: save a first set of one or more addresses to the third computer storage memory, access a second set of one or more addresses from the third computer storage memory, and determine whether a third set of one or more addresses are in final form or non-final form. It may be further programmed to transmit account creation display data to the first computer system, then receive a provider account creation request from the first computer system, then create a provider account for the first user, then associate the first user with a first provider page, then transmit element request display data to the first computer system, then receive element data from the first computer system, then create a first final address using the element data and one or more address connectors, then assign the first final address to the first provider page, then identify a first non-final address from one or more non-final addresses by element matching, then assign the first final address to the first non-final address, then create first final address data using the first final address, and then modify first non-final address data using a fourth set of one or more addresses and the first final address.

It may be further programmed to transmit content incorporation display data to the first computer system, then receive a content incorporation request from the first computer system, then receive content data from the first computer system, then determine time data, then combine the content data and the time data into a content data stream, and then convert the content data stream into first content data stream display data.

It may be further programmed to transmit the account creation display data to the second computer system, then receive a viewer account creation request from the second computer system, then create a viewer account for the second user, then transmit entry field data to the second computer system, then receive a entry from the second computer system, and then determine if the entry is address signifier inclusive.

If the entry is determined to be address signifier inclusive, the third processor may determine an address signifier type. If the address signifier type is determined to be a final address signifier type, then it identifies a element set for the entry, then determines element matching between the entry and a first set of one or more final addresses using the element set, and then if the entry and the first final address are determined to be element matching, then transmits the first content data stream display data to the second computer system. If the address signifier type is determined to be a non-final address signifier type, then identify the element set for the entry, then determine element matching between the entry and the one or more non-final addresses using the element set, and then if the entry and the first non-final address are determined to be element matching, then transmit the first non-final address data to the second computer system. If element matching between the entry and the second set of one or more addresses is not determined, then convert the address signifier type. If the entry is determined to be address signifier noninclusive, then the platform will determine geographic element inclusion, and if geographic element inclusion is determined, then determine element matching between the entry and the second set of one or more addresses using one or more geographic elements from the entry, determine subject element inclusion, and if subject element inclusion is determined, then determine element matching between the entry and the one or more addresses using one or more subject elements from the entry, and determine arbitrary element inclusion, and if arbitrary element inclusion is determined, determine element matching between the entry and the one or more addresses using one or more arbitrary elements from the entry. The platform will further identify a fifth set of one or more addresses using element matching determinations, then create resultation data using the fifth set of one or more addresses, and then transmit the resultation data to the second computer system. The platform may receive final address selection data from the second computer system, then identify a second final address using the final address selection data, and then transmit provider page data and second content data stream display data using second final address data to the second computer system. The playform may transmit element display data to the second computer system, then receive an element selection from the second computer system, then identify a sixth set of one or more addresses using the element selection, then receive an address selection from the second computer system, and then transmit second non-final address data to the second computer system.

The platform may receive a direction entry from the second computer system. If the direction entry is in a first direction, then the platform will transmit the second final address data and the second content data stream display data to the second computer system; if the direction entry is in a second direction, then transmit third final address data and third content data stream display data to the second computer system.

The present application concerns a content delivery platform as well as a categorization system. The content delivery platform provides a user or viewer (from hereon, "user") access to primarily streaming content from a plurality of sources. The content delivery platform is preferably, although not exclusively, a browser based application, and may be accessed either through a computer, mobile device, or television. Use of the platform on its own dedicated hardware is also contemplated. The categorization system is a means by which content sources are accessed via the content delivery platform, although it may also exist as a stand-alone means by which content sources are identified and organized.

In one aspect, the system comprises an address. In one embodiment, an address may be a unique sequence of alphanumerical text characters and symbols used to designate a content source. In another embodiment, an address may also be used to designate a set of content sources. Addresses that designate a single content source will be referred to hereon as "final addresses" while addresses that designate more than one content source will be referred to hereon as "non-final addresses". If one of the one or more content sources designated by a non-final address is itself designated by a final address, then it will be said hereon that the final address depends on the non-final address, and that the non-final address includes the final address. In yet another embodiment, a first non-final addresses may depend on a second non-final address. In this embodiment, a final address that depends on the first non-final address will also be said hereon to depend on the second non-final address, although it will be distinguished from the first kind of depency because the first kind will be referred to as "direct dependence" and this latter kind will be referred to as "indirect dependence".

In one aspect, an address comprises one or more elements. Elements are essentially categories used to describe, even if imperfectly, the kind of content the user may expect to find associated with a given content source. The use of more than one element in an address helps to convey to the user a narrower scope of the content available in a given stream. In one embodiment, the elements may be arranged within an address in any order. In another embodiment, the order in which the elements may be arranged enables different addresses to be distinguished from one another. In this embodiment, elements that appear prior correspond to broader categories, or in another sense, earlier filters that are applied to the set of all the content sources available. Elements that appear later in the address correspond to narrower categories, or in another sense, filters that are applied to the set of content sources after the set of all content sources have been filtered by the prior elements.

In one aspect, the system comprises an address signifier. An address signifier signifies that the text to which it is appended should be recognized as an address. In one embodiment, the atpersand (@) serves as the address signifier. In another embodiment, the excalamation point (!) serves as the address signifier.

In another aspect, different address signifiers signify different facts about a given address. In one embodiment, the atpersand (@) signifies that an address is a final address. In another embodiment, the dollar sign ($) signifies that an address is a non-final address.

In one aspect, the system comprises an address connector. The address connector may precede or follow one or more elements in the address, thereby signifying the relationship between the one or more elements. In one embodiment, the period (.) may be placed in between elements, generally. In another embodiment, when a final address, or an address that designates a single content source, features more than one element, the colon (:) may be placed prior to the last element.

In one embodiment, the address comprises one or more geographical elements. A geographical element, such as "USA" in "@USA", refers to a geographical location, such as a country, state or province, or city or town. More than one geographical element may be used to signify greater specificity, as in "@USA.NewYork".

In one embodiment, the address comprises one or more subject elements. A subject element, such as "Art" in "@Art", refers to a category of content, such as music, sports, news, etc. More than one subject element may be used to signify greater specificity, as in "@Art.Rennaisance".

In one embodiment, the address comprises one or more arbitrary elements. An arbitrary element may be used in place of a geographical or subject element, although it may also be used in conjunction with either or both. It may comprise either singly or in combination one or more numbers and/or one or more letters. For example, "CS001" in "@Technology.Internet.CS001" serves as the arbitrary element. The use of arbitrary elements enable one or more content delivery streams to be distinguished from one another, even if they are identical in their geographic and/or subject elements.

In one aspect, the platform comprises a search prompt. In another aspect, the platform comprises a display of one or more addresses. In one embodiment, the user may enter a final address into the search prompt or select a final address from the display of one or more addresses, and the platform will thereafter display the content associated with that final address. In another embodiment, the user may enter a non-final address into the search prompt or select a non-final address from the display of one or more addresses, and the platform will display the one or more addresses, whether final or non-final, that depend on that non-final address. In yet another embodiment, if the user performs the same action, the platform will display the one or more final addresses that directly or indirectly depend on the non-final address, but not any non-final addresses.

In one aspect, if the user enters an incorrect address, the platform will attempt to remedy the entry. In one embodiment, if the user enters a non-final address, but appends it with a final address signifier, (such as the atpersand), then the platform will display the content source associated with the most popular final address that depends on that non-final address. In another embodiment, the platform will display the content source associated with the final address most commonly entered or selected by that user. In yet another embodiment, the platform will display the final and/or non-final addresses that depend on that non-final address.

In one embodiment, the platform determines the popularity of addresses based on the number of times it is selected by viewing users. In another embodiment, the platform determines the popularity of addresses based on tracking the number of hours each address is kept open in a browser.

In one embodiment, if the user enters a final address, but appends it with a non-final address signifier (such as the dollar sign), then the platform will display the content source associated with the final address. In another embodiment, the platform will display the final and/or non-final address which depend upon the non-final address on which that final address depends.

In one embodiment, if the user enters an address that is not recognized formally as either a final or non-final address by the platform, then the platform compares the element(s) and the relationship between the element(s) featured in the address as entered, with the set of all addresses handled by the platform. If a single match is made, and the matching address is a final address, then the content source associated with that final address is displayed; if a single match is made and the matching address is a non-final address, then the final and/or non-final addresses associated with that non-final address are displayed. If more than one match is made, then those more than one matches are displayed to the user. If no matches are made, then comparison is done once more, only with the elements themselves and not the relationship between them, with the resulting matches displayed as before. If still no matches are made, then elements are subtracted from the address in order of most narrow to most broad, until at least one match is made. In another embodiment, the elements of the address most recently searched or selected are added to the address as entered, starting with the most specified elements, and compared with the set of addresses as handled by the platform until a match is made. If no match is made, added elements are removed from the new address until a match is made.

In one embodiment, if the user enters an address that is not recognized as a final or non-final address, then the user's geographical information is used that geographical elements associated with that information are added to the address so as to include the elements as entered. This new address is compared with the set of all addresses handled by the program. If no match is made, then the more narrow geographical elements are removed one by one until a match is made. In another embodiment, the geographical elements most commonly used in previous searches or selections of addresses, starting with the most specified geographical elements, are used in the same manner as the geographical elements above.

In one embodiment, the user, upon activating or accessing an activated channel designation means, may, by means of a remote control, cycle through channels. In another embodiment, the viewing user can cycle through addresses by means of buttons on the user interface.

In one embodiment, the user may identify which element he or she wishes to cycle through. The viewer may indicate that he or she intends to stay within a certain set of elements by cycle through one of them by either selecting an element and then selecting an up or down button on the user interface or as registered through key commands. The elements that precede the selected element are to remain fixed.

In one embodiment, the platform may prompt the user to inform the user that new channels are available. This prompt may be prominently displayed on a main page.

In one aspect, elements are selected by the content provider or user. These elements should identify the qualities of the content provided. For example, if a provider is providing content focusing on a geographic area such as Kansas, the provider may enter or select "Kansas" as the geographic element. If a content provider is providing content focusing on art, the provider may enter or select "Art" as the subject element. The platform may provide or display suggestions to the content provider for elements that may be appropriate based on the content provided.

In one aspect, elements may be assigned to an address based on other elements that are entered or selected by the content provider user. This chiefly may occur if an element typically depends on another element because of a categorical child-parent relationship. For example, if "Renaissance" is entered or selected by the content provider user, then the platform will assign "Art" to the address, thereby rendering a portion of the address "@Art.Renassiance".

In one embodiment, the address as a whole operates as a hyperlink. If the address is selected by a viewing user, the platform will display a provoder page associated with the address. In another emobidment, each element operates as its own unique hyperlink. In one version, when an element is selected, the platform will display all of the addresses in which that element is included. In another version, when an element is selected, the platform will display all of the addresses in which that element and all hierarchically preceding elements appear. For example, In the address "@Kansas.Art.Music . . . ", if the second element, "Art", is selected, then the addresses with the first and second elements will appear, but not addresses that lack the first element. In another embodiment, the arbitrary element operate as a hyperlink to the address while the other elements operate as hyperlinks to a display or list of all addresses in which that element appears.

In one aspect, the platform identifies discrete elements by determining if a string within the address is followed by the address connector, such as a period. If it is followed by an address connector, then platform will continue reading the string until it comes to another address connector, an address signifier, or the end of the string.

In one aspect, the platform may receive keyword entries in addition to addresses. The platform may discern between keyword entries and address entries by identifying whether the entry includes an address signifier.

In one aspect, an arbitrary element is automatically assigned to an address based on the brand or title entered by the content provider, or by the content provider's username. In one embodiment, the arbitrary element is also prominently displayed on the provider page.

In one aspect, the platform will display on a main page a set of final addresses. This set may be determined by final addresses that are added to a "favorite list" by the viewer, by their popularity as determined by selections or total time viewed by viewers, as selected by administrators, and/or as bid upon or paid by content providers.

In one aspect, addresses may be linked to QR codes or similar graphical identification objects that may be scanned by a phone or image processor. When a scan is made, the provider page and content associated with the address may be accessed by the user.

In one aspect, the platform may assign an "adult" or "mature" element. Viewing users can choose to block addresses with the adult or mature element using parental controls accessed in the user interface. This element may be fixed at the end of an address. In another aspect, adult or mature content may be indicated with an address signifier, which may appear at the beginning, the end, or anywhere in between in the address.

DETAILED DESCRIPTION OF THE DRAWINGS

Figure 1:
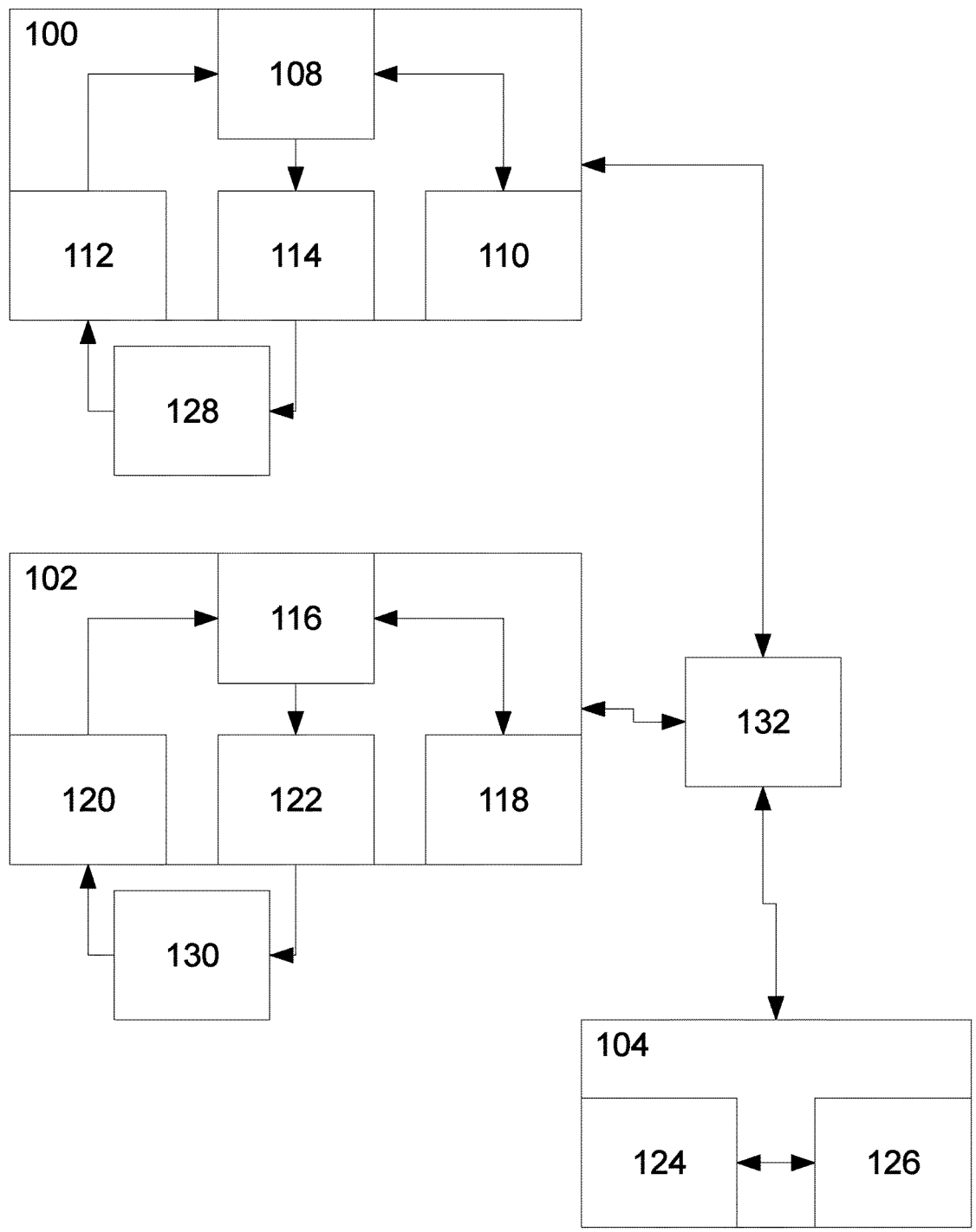
FIG. 1 shows an exemplary computer system.

As shown in FIG. 1, the system may include a first computer system 102, a second computer system 104, and a third computer system 106, the first computer system comprising a first processor 108, a first computer storage memory 110, a first set of one or more input devices 112, and a first display device 114, the second computer system comprising a second processor 116, a second computer storage memory 118, a second set of one or more input devices 120, and a second display device 122, the third computer system comprising a third processor 124 and a third computer storage memory 126, the first computer system operated by a first user 128, the second computer system operated by a second user 130, the first computer system, the second computer system, and the third computer system connected to a network 132 of one or more computer systems. The first user may typically be a content providing user and the second user may typically be a viewing user, but the two roles are not mutually exclusive and may coexist in the same user. In one embodiment, an administrative user operating the third computer system may also be a content providing user.

Figure 2:
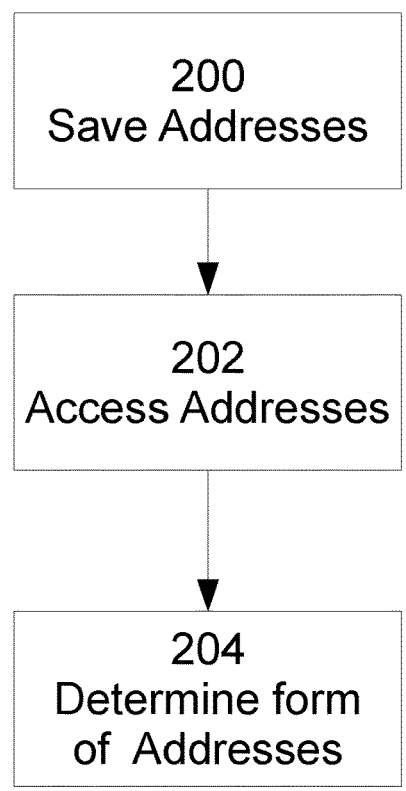
FIG. 2 is a flowchart of an exemplary platform system process.

As shown in FIG. 2, the third processor may save a first set of one or more addresses to the third computer storage memory 200, then access a second set of one or more addresses from the third computer storage memory 202, and then determine whether a third set of one or more addresses are in final form or non-final form 204. These steps may be taken in order or in any other order. The addresses may be stored, saved, modified, and accessed in storage memory in the form of one or more databases.

Figure 3:
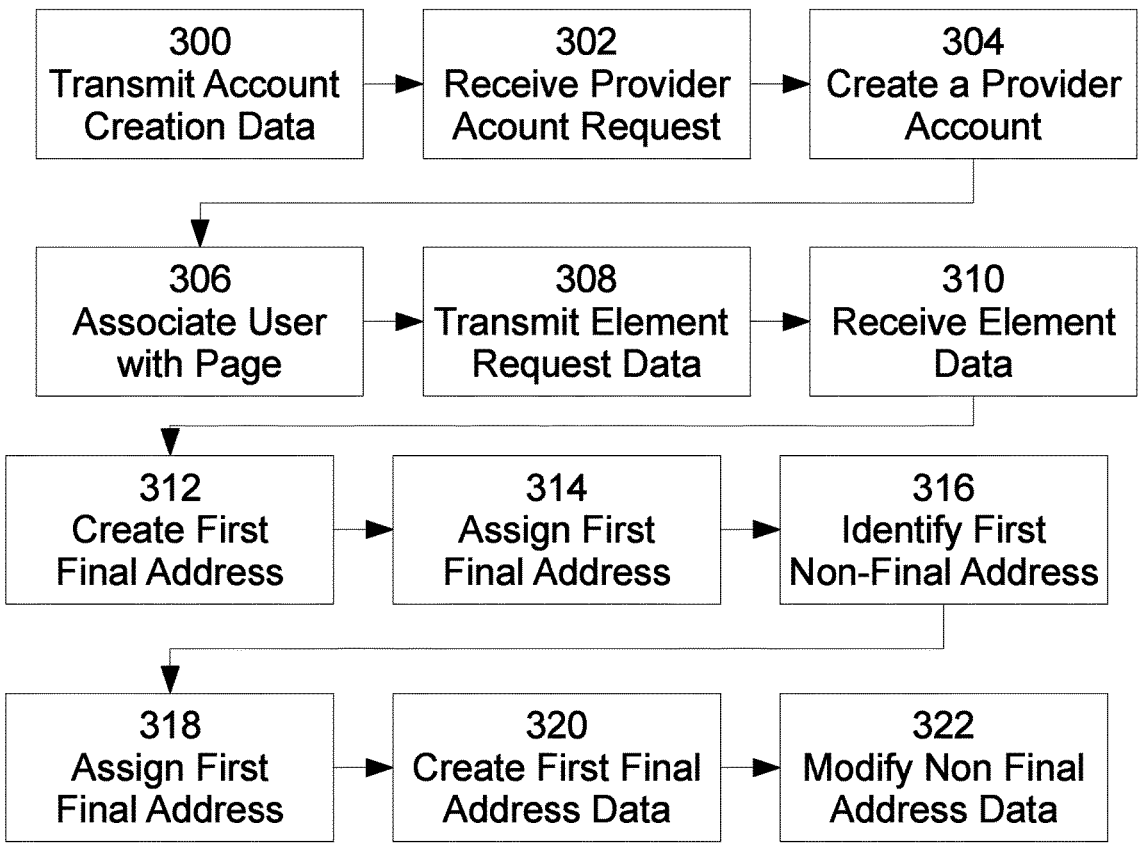
FIG. 3 is a flowchart of an exemplary platform system process.

As shown in FIG. 3, the third processor may transmit account creation display data to the first computer system 300, then receive a provider account creation request from the first computer system 302, then create a provider account for the first user 304, then associate the first user with a first provider page 306, then transmit element request display data to the first computer system 308, then receive element data from the first computer system 310, then create a first final address using the element data and one or more address connectors 312, then assign the first final address to the first provider page 314, then identify a first non-final address from one or more non-final addresses by element matching 316, then assign the first final address to the first non-final address 318, then create first final address data using the first final address 320, and then modify first non-final address data using a fourth set of one or more addresses and the first final address 322. These steps may be taken in order or in any other order. The provider page, in addition to featuring an area where content is displayed, may also feature subsections in which content linked to other provider pages may be displayed and accessed by a viewing user. The account creation options may be accessed via the user interface and provide for acount creation.

Figure 4:
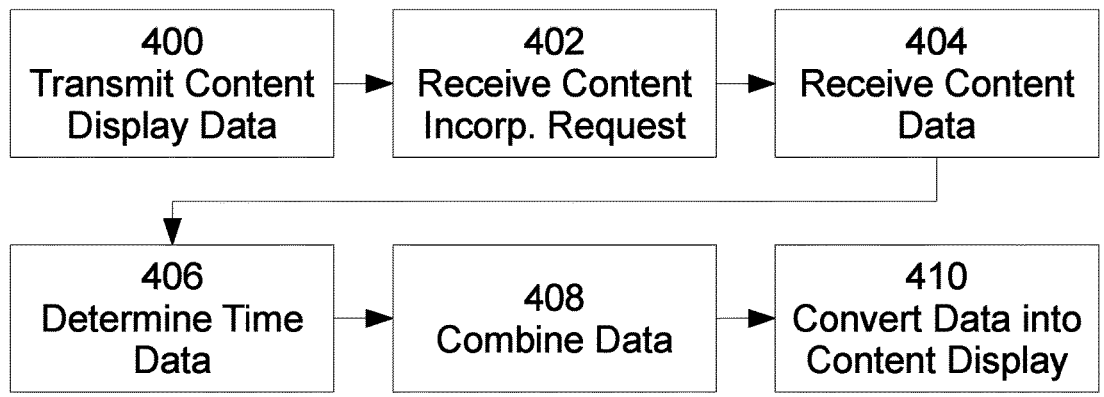
FIG. 4 is a flowchart of an exemplary platform system process.

As shown in FIG. 4, the third processor may transmit content incorporation display data to the first computer system 400, then receive a content incorporation request from the first computer system 402, then receive content data from the first computer system 404, then determine time data 406, then combine the content data and the time data into a content data stream 408, and then convert the content data stream into first content data stream display data 410. These steps may be taken in order or in any other order. Content incorporation may involve the uploading of content from the first computer system or providing a hyperlink to where the content may be located on the internet.

Figure 5:
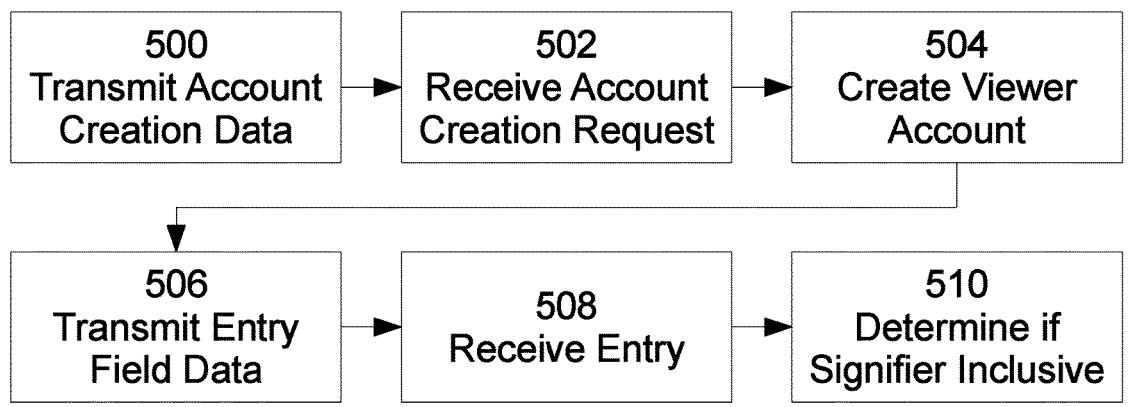
FIG. 5 is a flowchart of an exemplary platform system process.

As shown in FIG. 5, the third processor may transmit the account creation display data to the second computer system 500, then receive a viewer account creation request from the second computer system 502, then create a viewer account for the second user 504, then transmit entry field data to the second computer system 506, then receive a entry from the second computer system 508, and then determine if the entry is address signifier inclusive 510. These steps may be taken in order or in any other order. An entry is address signifer inclusive if it contains an address signifier within it as text or metadata.

Figure 6:
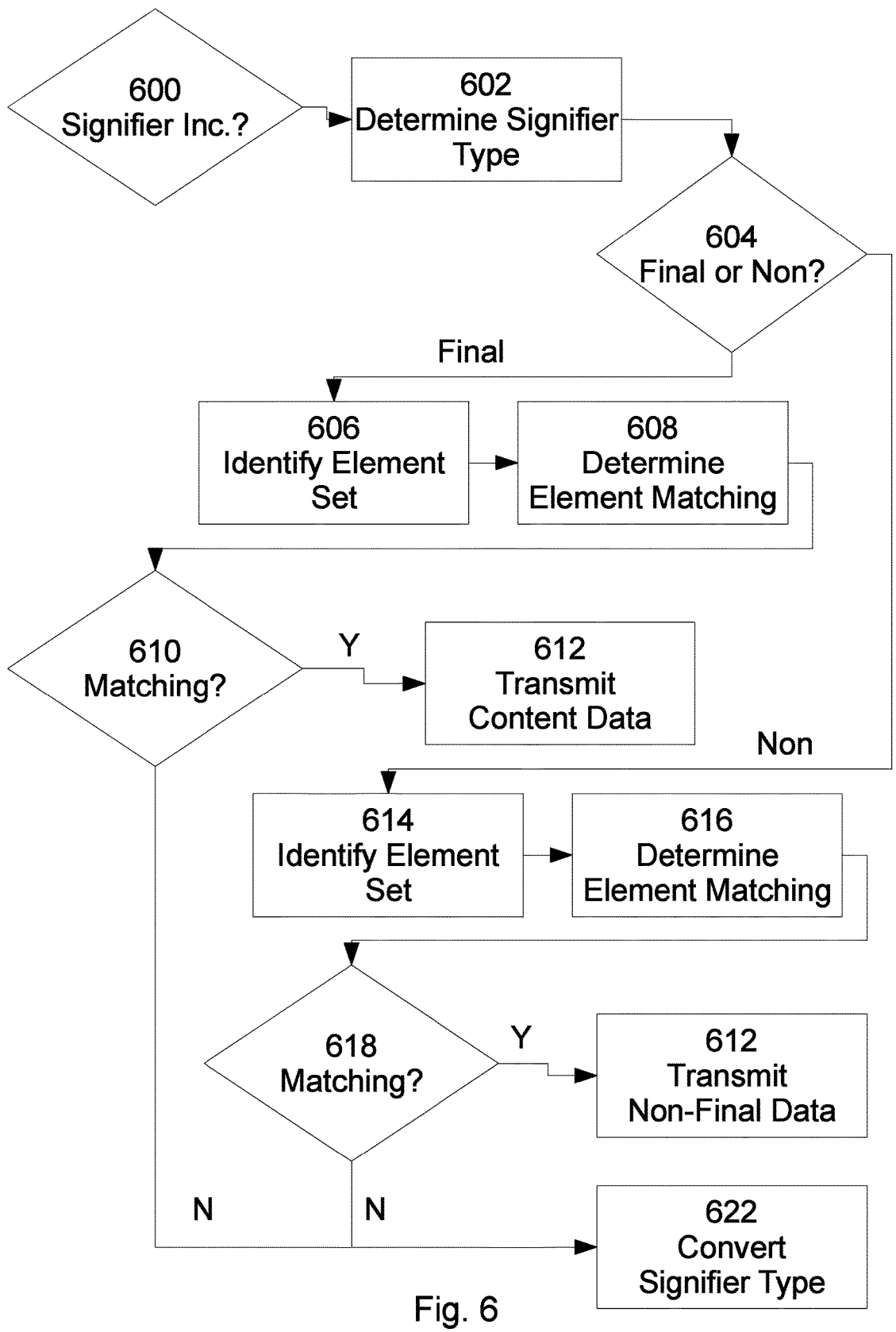
FIG. 6 is a flowchart of an exemplary platform system process.

As shown in FIG. 6, the third processor may, if the entry is determined to be address signifier inclusive 600 determine an address signifier type 602. If the address signifier type is determined to be a final address signifier type 604, then identify a element set for the entry 606, then determine element matching between the entry and a first set of one or more final addresses using the element set 608, and then if the entry and the first final address are determined to be element matching 610, then transmit the first content data stream display data to the second computer system 612. Element matching occurs when two items possess some or all of the same elements. Element matching may occur discretely, i.e. one element at a time, or for the elements as a whole. In one embodiment, the ordering of the elements is also analyzed.

If the address signifier type is determined to be a non-final address signifier type, then identify the element set for the entry 614, then determine element matching between the entry and the one or more non-final addresses using the element set 616, and then if the entry and the first non-final address are determined to be element matching 618, then transmit the first non-final address data to the second computer system 620. If element matching between the entry and the second set of one or more addresses is not determined, then convert the address signifier type 622. These steps may be taken in order or in any other order.

Figure 7:
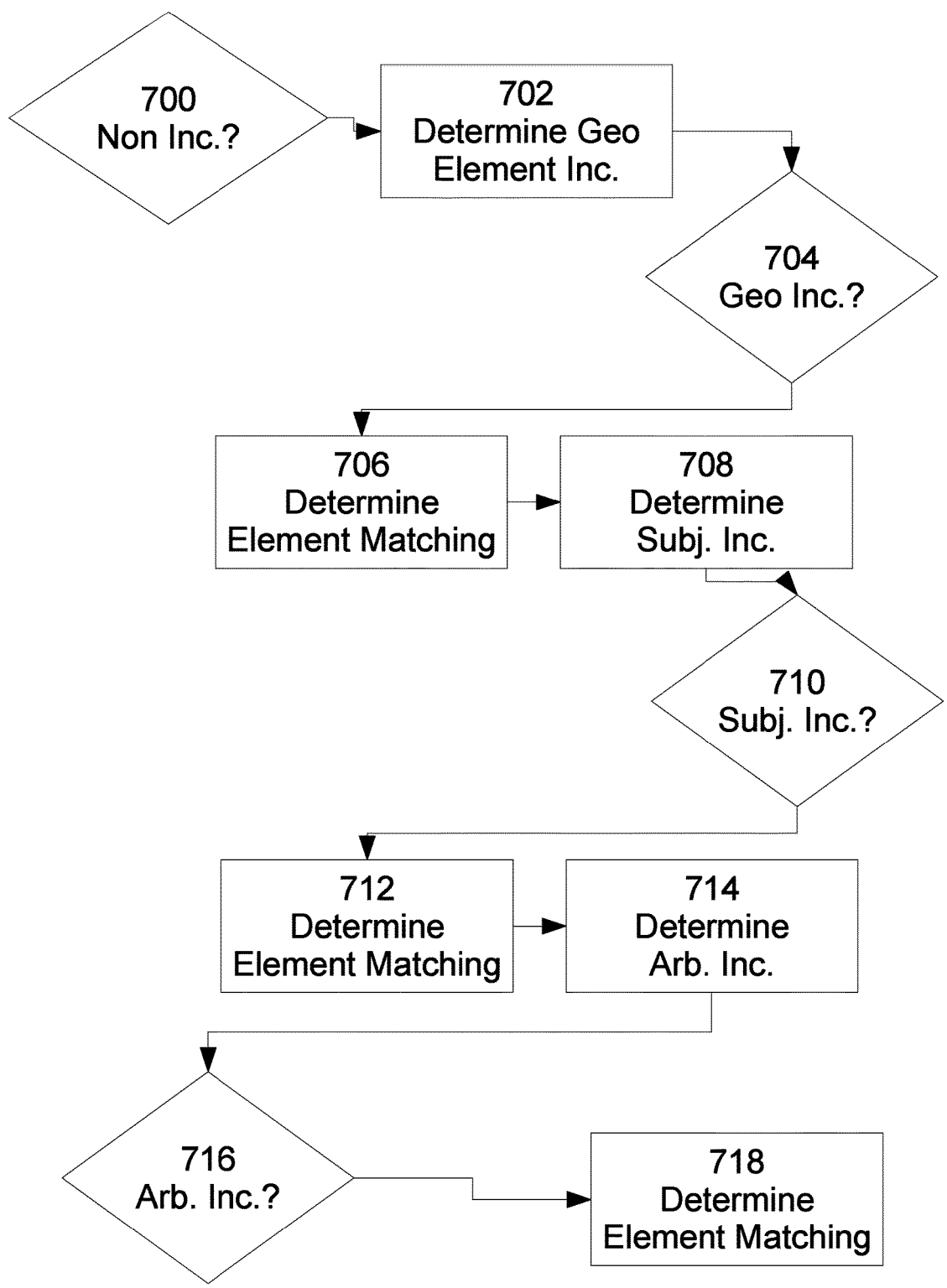
FIG. 7 is a flowchart of an exemplary platform system process.

As shown in FIG. 7, the third processor may, if the entry is determined to be address signifier noninclusive 700, then determine geographic element inclusion 702, and if geographic element inclusion is determined 704, then determine element matching between the entry and the second set of one or more addresses using one or more geographic elements from the entry 706, determine subject element inclusion 708, and if subject element inclusion is determined 710, then determine element matching between the entry and the one or more addresses using one or more subject elements from the entry 712, and determine arbitrary element inclusion 714, and if arbitrary element inclusion is determined 716, determine element matching between the entry and the one or more addresses using one or more arbitrary elements from the entry 718. These steps may be taken in order or in any other order. Geographic element inclusion may be determined by comparing elements in the entry to a list of recognied geographic elements. The same is true for subject elements and arbitrary elements. However, if an element is neither determined to be a geographic element nor a subject element, then it may be identified as an arbitrary element.

Figure 8:
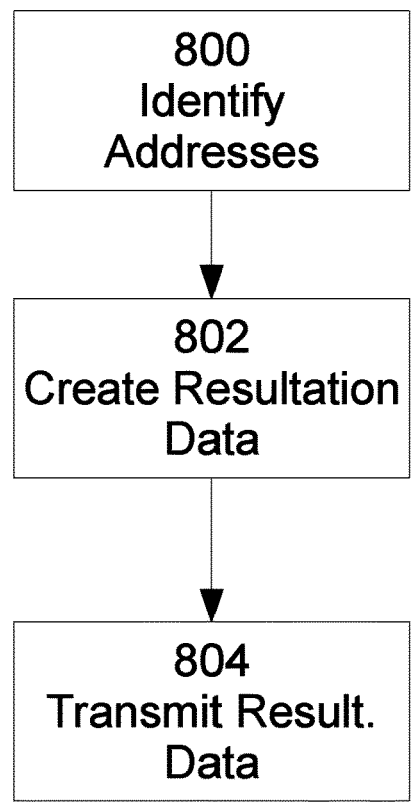
FIG. 8 is a flowchart of an exemplary platform system process.

As shown in FIG. 8, the third processor may identify a fifth set of one or more addresses using element matching determinations 800, then create resultation data using the fifth set of one or more addresses 802, and then transmit the resultation data to the second computer system 804. These steps may be taken in order or in any other order. Resultation data may include a list of addresses that contain text and/or elements that match terms or elements from the entry.

Figure 9:
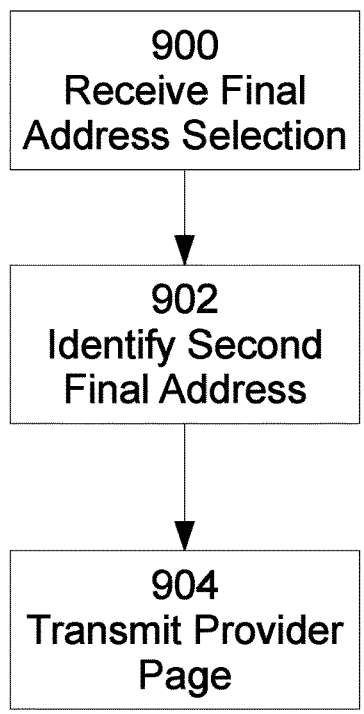
FIG. 9 is a flowchart of an exemplary platform system process.

As shown in FIG. 9, the third processor may receive final address selection data from the second computer system 900, then identify a second final address using the final address selection data 902, and then transmit provider page data and second content data stream display data using second final address data to the second computer system 904. These steps may be taken in order or in any other order.

Figure 10:
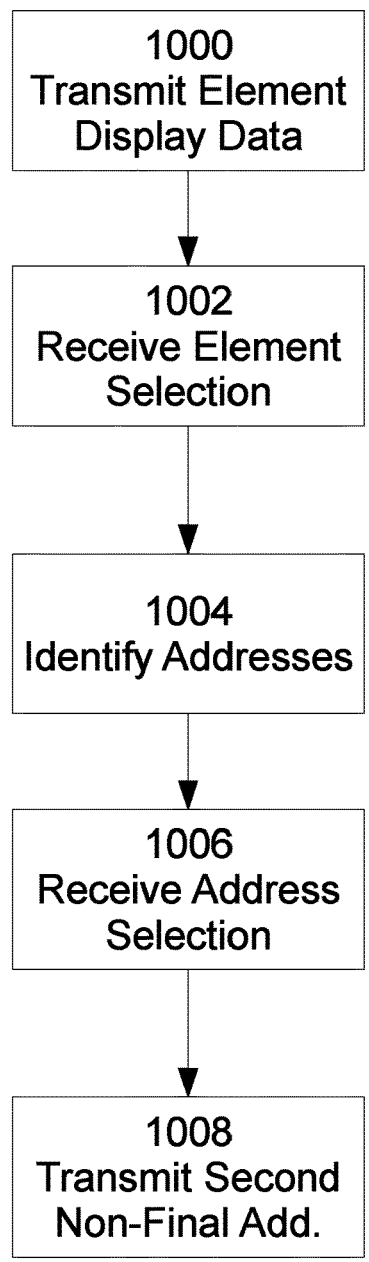
FIG. 10 is a flowchart of an exemplary platform system process.

As shown in FIG. 10, the third processor may transmit element display data to the second computer system 1000, then receive an element selection from the second computer system 1002, then identify a sixth set of one or more addresses using the element selection 1004, then receive an address selection from the second computer system 1006, and then transmit second non-final address data to the second computer system 1008. These steps may be taken in order or in any other order. Element selection may be made by the second user. Elements may appear on the display screen for the second computer system, and the second user may pointedly select one or more elements.

Figure 11:
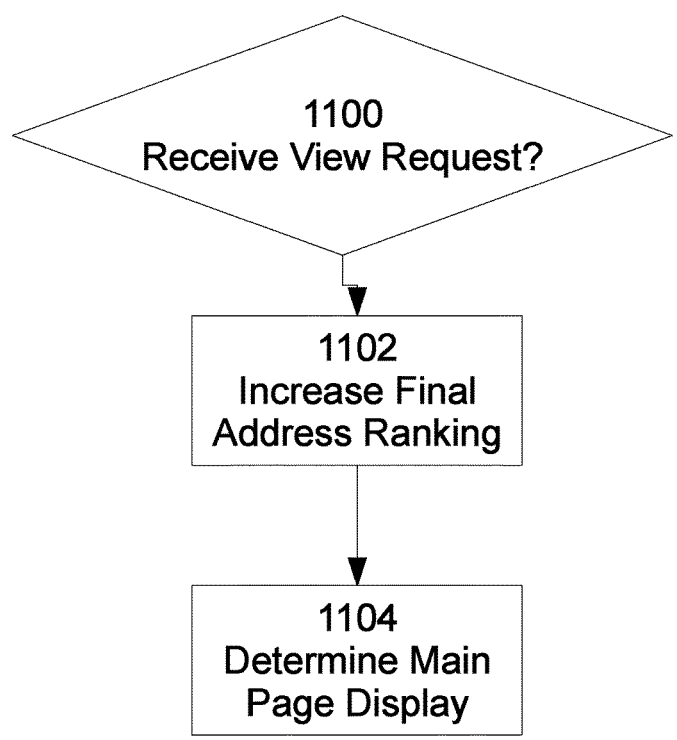
FIG. 11 is a flowchart of an exemplary platform system process.

As shown in FIG. 11, the third processor may increase a final address ranking factor 1102 each time a view request is received 1100. This will help obtain popularity results for final addresses, which may then be used to populate a home or main page for the platform 1104.

Figure 12:
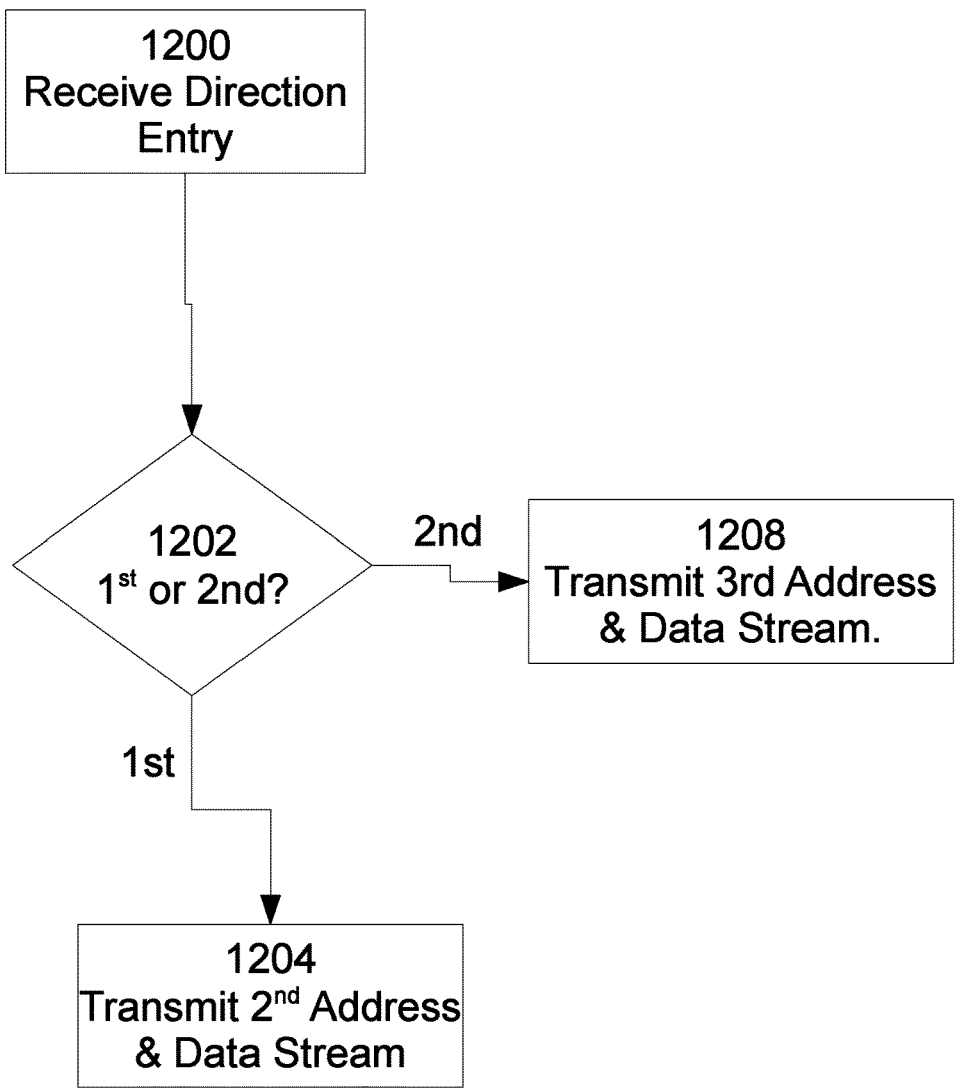
FIG. 12 is a flowchart of an exemplary platform system process.

As shown in FIG. 12, the third processor may receive a direction entry from the second computer system 1200. If the direction entry is in a first direction 1202, then transmit the second final address data and the second content data stream display data to the second computer system 1204. If the direction entry is in a second direction, then transmit third final address data and third content data stream display data to the second computer system 1208. These steps may be taken in order or in any other order. The directions may be registered when a user presses up, down, or any keyboard, mouse, and/or voice command.

Figure 13:
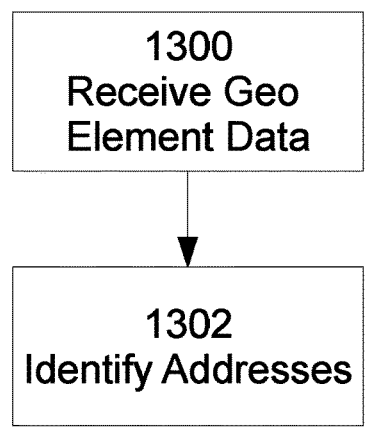
FIG. 13 is a flowchart of an exemplary platform system process.

As shown in FIG. 13, the third processor may receive geographic element data from the second user 1300 and then identify a seventh set of one or more addresses using the geographic element data 1302. These steps may be taken in order or in any other order. Geographic element data here is linked to the geographic location in which the second user is operating the second computer system, and may be obtained directly from the user via a questionairre or by accessing information from the computer or the account that is logged in at the time.

Figure 14:
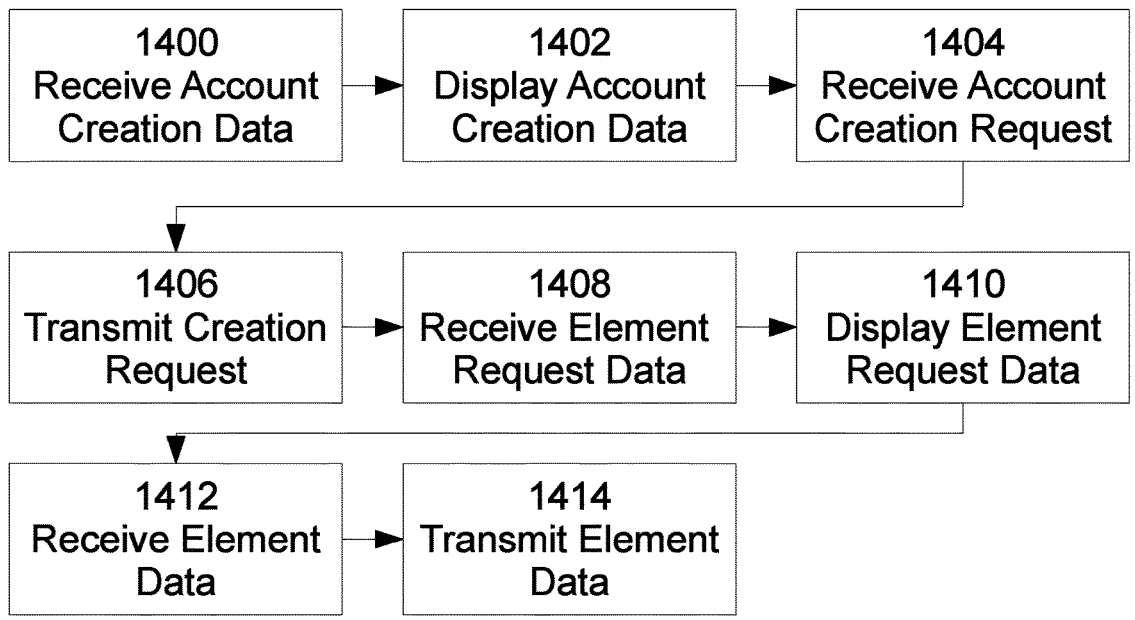
FIG. 14 is a flowchart of an exemplary platform system process.

As shown in FIG. 14, the first processor may be programmed to receive the account creation display data from the third computer system 1400, then display account creation options on the first display device using the account creation display data 1402, then receive the provider account creation request from the first user using the first set of one or more input devices 1404, then transmit the provider account creation request to the third computer system 1406, then receive the element request display data from the third computer system 1408, display the element request display data on the first display device 1410, then receive the element data from the first user using the first set of one or more input devices 1412, and then transmit the element data to the third computer system 1414. These steps may be taken in order or in any other order.

Figure 15:
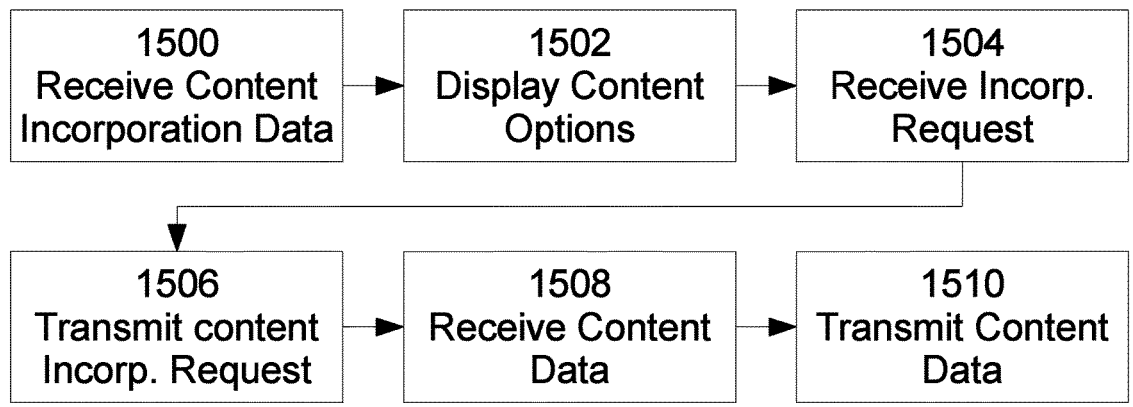
FIG. 15 is a flowchart of an exemplary platform system process.

As shown in FIG. 15, the first processor may be programmed to receive the content incorporation display data from the third computer system 1500, then display content incorporation options on the first display device using the content incorporation display data 1502, then receive the content incorporation request from the first user using the first set of one or more input devices 1504, then transmit the content incorporation request to the third computer system 1506, then receive the content data from the first user using the first set of one or more input devices 1508, and then transmit the content data to the third computer system 1510. These steps may be taken in order or in any other order. There may be two components a content stream-content data and time data. Time data may identify where in a playlist content should reside or be positioned. Time data may also include information about the length of the content data.

Figure 16:
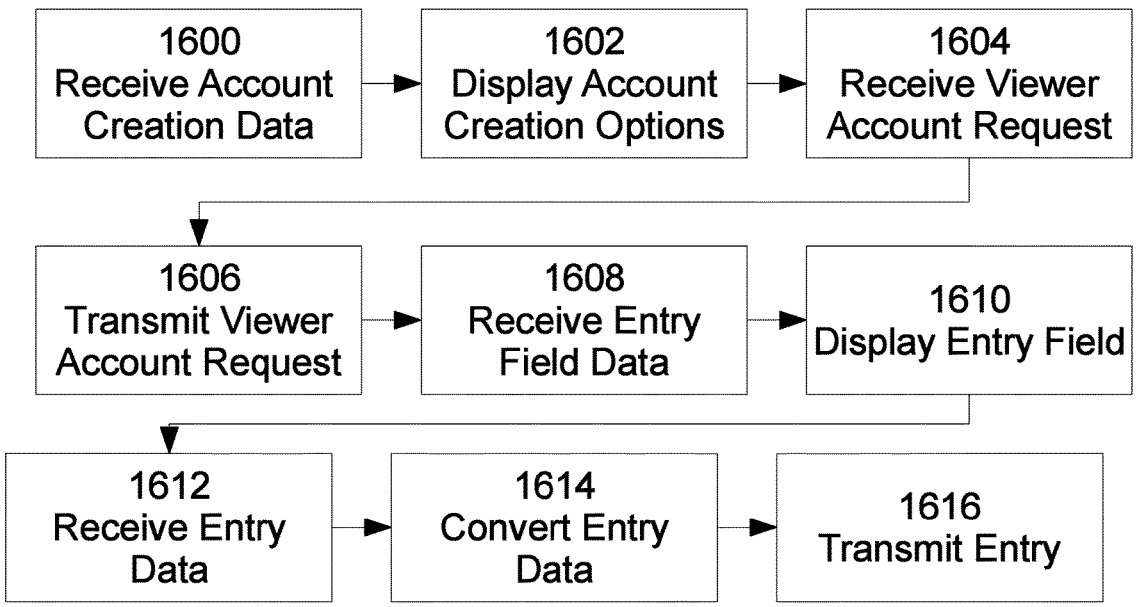
FIG. 16 is a flowchart of an exemplary platform system process.

As shown in FIG. 16, the second processor may be programmed to receive the account creation display data from the third computer system 1600, then display the account creation options on the second display device using the account creation display data 1602, then receive the viewer account creation request from the second user using the second set of one or more input devices 1604, then transmit the viewer account creation request to the third computer system 1606, then receive the entry field data from the third computer system 1608, then display an entry field on the second display device using the entry field data 1610, then receive user generated entry data from the second user using the second set of one or more input devices 1612, then convert the user generated entry data into the entry 1614, and then transmit the entry to the third computer system 1616. These steps may be taken in order or in any other order. Entry field data may be obtained or created via a user interface display and a search term field.

Figure 17:
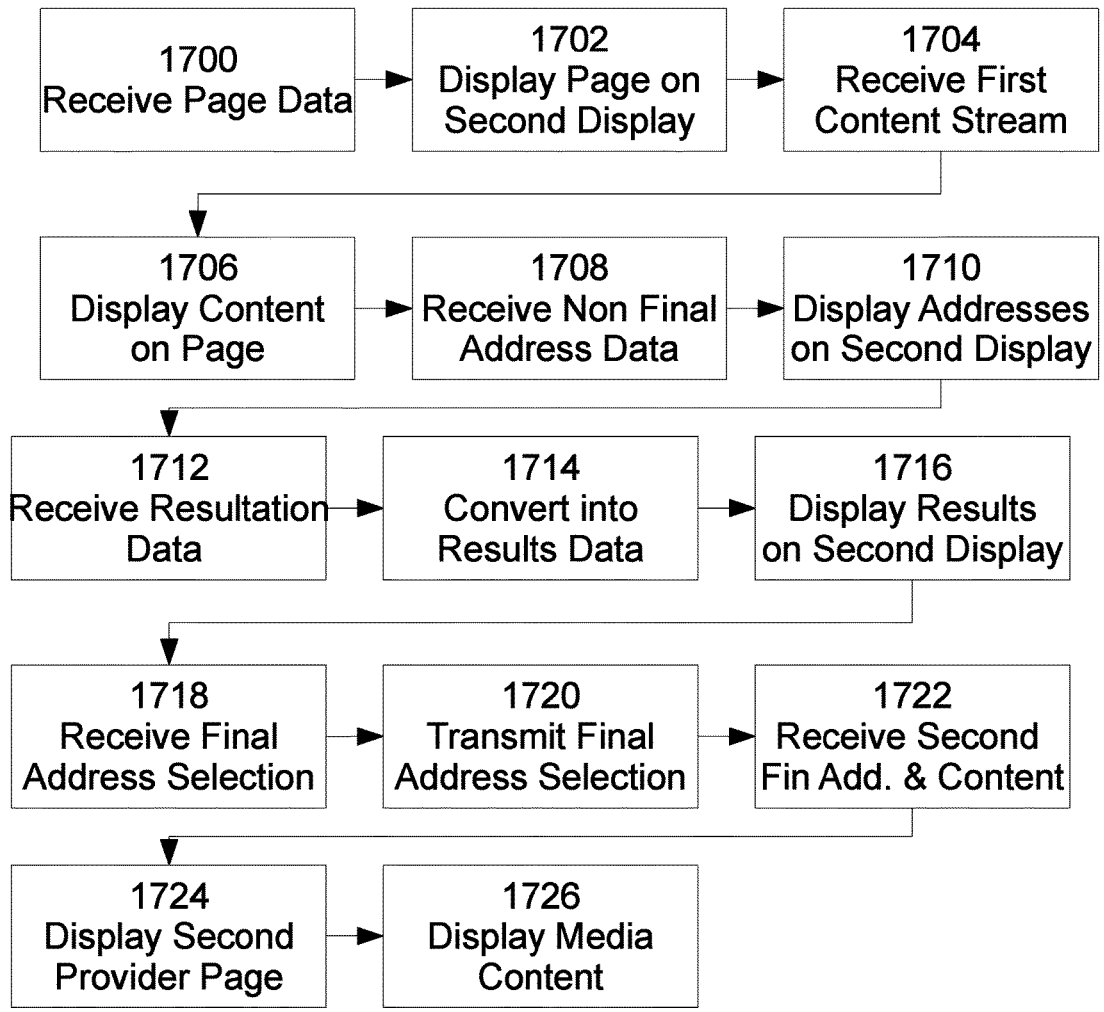
FIG. 17 is a flowchart of an exemplary platform system process.

As shown in FIG. 17, the second processor may be programmed to receive the provider page data from the third computer system 1700, then display the first provider page on the second display device using the provider page data 1702, then receive the first content data stream display data from the third computer system 1704, then display media content on the first provider page using the first content data stream display data 1706, then receive the first non-final address data from the third computer system 1708, then display the fourth set of one or more addresses on the second display device using the first non-final address data 1710, then receive the resultation data from the third computer system 1712, then convert the resultation data into results display data 1714, then display results using the results display data on the second display device 1716, then receive the final address selection data from the second user using the second set of one or more input devices 1718, then transmit the final address selection data to the third computer system 1720, then receive the second final address data and the second content data stream display data from the third computer system 1722, then display a second provider page on the second display device using the second final address data 1724, and then display media content on the second provider page using the second content data stream display data 1726. These steps may be taken in order or in any other order.

Figure 18:
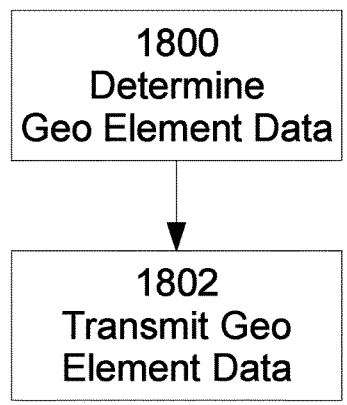
FIG. 18 is a flowchart of an exemplary platform system process.

As shown in FIG. 18, the second processor may be programmed to determine the geographic element data 1800 and then transmit the geographic element data to the third computer system 1802. These steps may be taken in order or in any other order.

Figure 19:
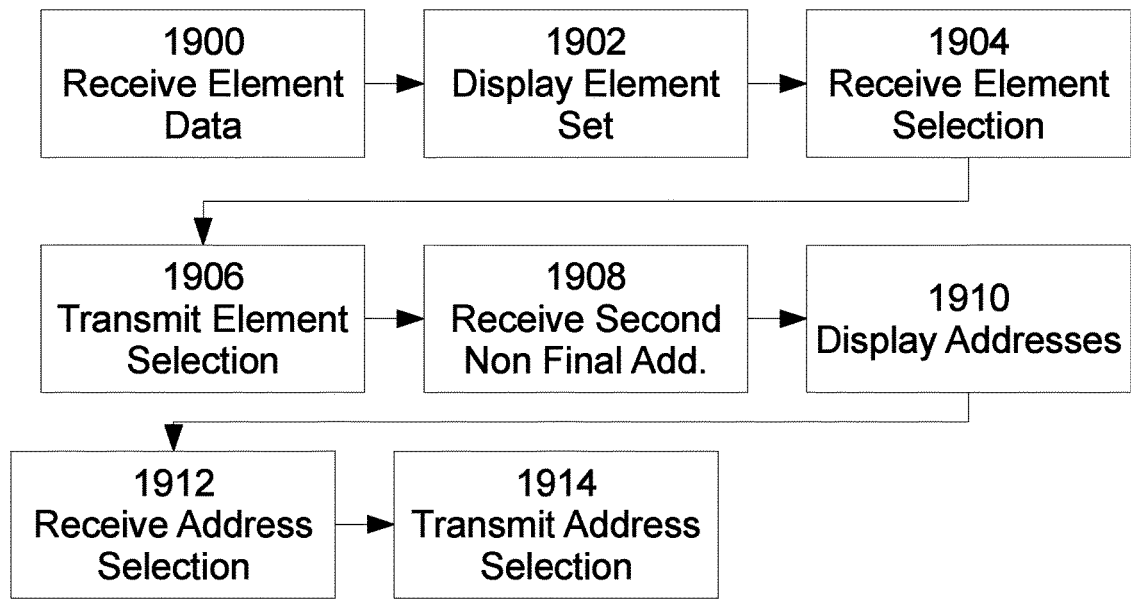
FIG. 19 is a flowchart of an exemplary platform system process.

As shown in FIG. 19, the second processor may be programmed to receive the element display data from the third computer system 1900, then display the element set on the second display device 1902, receive the element selection from the second user using the second set of one or more input devices 1904, then transmit the element selection to the third computer system 1906, then receive the second non-final address data from the third computer system 1908, then display an eighth set of one or more addresses on the second display device using the second non-final address data 1910, then receive the address selection from the second user using the second set of input devices 1912, and then transmit the address selection to the third computer system 1914. These steps may be taken in order or in any other order.

Figure 20:
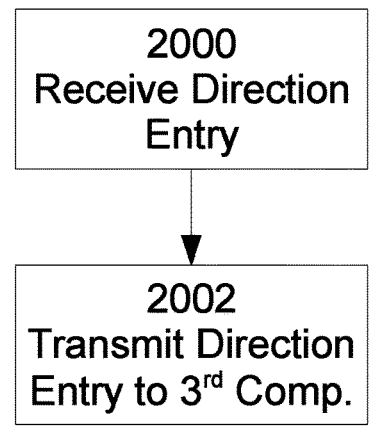
FIG. 20 is a flowchart of an exemplary platform system process.

As shown in FIG. 20, the second processor may be programmed to receive the direction entry from the second user using the second set of one or more input devices 2000 and then transmit the direction entry to the third computer system 2002. These steps may be taken in order or in any other order.

The invention claimed is:

1. A system including a first computer system, a second computer system, and a third computer system, the first computer system comprising a first processor, a first computer storage memory, a first set of one or more input devices, and a first display device, the second computer system comprising a second processor, a second computer storage memory, a second set of one or more input devices, and a second display device, the third computer system comprising a third processor and a third computer storage memory, the first computer system operated by a first user, the second computer system operated by a second user, the first computer system, the second computer system, and the third computer system connected to a network of one or more computer systems;

the third processor programmed to: save a first set of one or more addresses to the third computer storage memory, access a second set of one or more addresses from the third computer storage memory, and determine whether a third set of one or more addresses are in final form or non-final form;

transmit account creation display data to the first computer system, then receive a provider account creation request from the first computer system, then create a provider account for the first user, then associate the first user with a first provider page, then transmit element request display data to the first computer system, then receive element data from the first computer system, then create a first final address using the element data and one or more address connectors, then assign the first final address to the first provider page, then identify a first non-final address from one or more non-final addresses by element matching, then assign the first final address to the first non-final address, then create first final address data using the first final address, and then modify first non-final address data using a fourth set of one or more addresses and the first final address;

transmit content incorporation display data to the first computer system, then receive a content incorporation request from the first computer system, then receive content data from the first computer system, then determine time data, then combine the content data and the time data into a content data stream, and then convert the content data stream into first content data stream display data;

transmit the account creation display data to the second computer system, then receive a viewer account creation request from the second computer system, then create a viewer account for the second user, then transmit entry field data to the second computer system, then receive a entry from the second computer system, and then determine if the entry is address signifier inclusive;

if the entry is determined to be address signifier inclusive, then determine an address signifier type;

if the address signifier type is determined to be a final address signifier type, then identify a element set for the entry, then determine element matching between the entry and a first set of one or more final addresses using the element set, and then if the entry and the first final address are determined to be element matching, then transmit the first content data stream display data to the second computer system;

if the address signifier type is determined to be a non-final address signifier type, then identify the element set for the entry, then determine element matching between the entry and the one or more non-final addresses using the element set, and then if the entry and the first non-final address are determined to be element matching, then transmit the first non-final address data to the second computer system;

if element matching between the entry and the second set of one or more addresses is not determined, then convert the address signifier type; if the entry is determined to be address signifier noninclusive, then: determine geographic element inclusion, and if geographic element inclusion is determined, then determine element matching between the entry and the second set of one or more addresses using one or more geographic elements from the entry, determine subject element inclusion, and if subject element inclusion is determined, then determine element matching between the entry and the one or more addresses using one or more subject elements from the entry, and determine arbitrary element inclusion, and if arbitrary element inclusion is determined, determine element matching between the entry and the one or more addresses using one or more arbitrary elements from the entry;

identify a fifth set of one or more addresses using element matching determinations, then create resultation data using the fifth set of one or more addresses, and then transmit the resultation data to the second computer system;

receive final address selection data from the second computer system, then identify a second final address using the final address selection data, and then transmit provider page data and second content data stream display data using second final address data to the second computer system;

transmit element display data to the second computer system, then receive an element selection from the second computer system, then identify a sixth set of one or more addresses using the element selection, then receive an address selection from the second computer system, and then transmit second non-final address data to the second computer system;

receive a direction entry from the second computer system;

if the direction entry is in a first direction, then transmit the second final address data and the second content data stream display data to the second computer system;

if the direction entry is in a second direction, then transmit third final address data and third content data stream display data to the second computer system;

increase a final address ranking factor each time a view request is received;

receive geographic element data from the second user and then identify a seventh set of one or more addresses using the geographic element data;

the first processor programmed to: receive the account creation display data from the third computer system, then display account creation options on the first display device using the account creation display data, then receive the provider account creation request from the first user using the first set of one or more input devices, then transmit the provider account creation request to the third computer system, then receive the element request display data from the third computer system, display the element request display data on the first display device, then receive the element data from the first user using the first set of one or more input devices, and then transmit the element data to the third computer system;

receive the content incorporation display data from the third computer system, then display content incorporation options on the first display device using the content incorporation display data, then receive the content incorporation request from the first user using the first set of one or more input devices, then transmit the content incorporation request to the third computer system, then receive the content data from the first user using the first set of one or more input devices, and then transmit the content data to the third computer system;

the second processor programmed to: receive the account creation display data from the third computer system, then display the account creation options on the second display device using the account creation display data, then receive the viewer account creation request from the second user using the second set of one or more input devices, then transmit the viewer account creation request to the third computer system, then receive the entry field data from the third computer system, then display an entry field on the second display device using the entry field data, then receive user generated entry data from the second user using the second set of one or more input devices, then convert the user generated entry data into the entry, and then transmit the entry to the third computer system;

receive the provider page data from the third computer system, then display the first provider page on the second display device using the provider page data, then receive the first content data stream display data from the third computer system, then display media content on the first provider page using the first content data stream display data, then receive the first non-final address data from the third computer system, then display the fourth set of one or more addresses on the second display device using the first non-final address data, then receive the resultation data from the third computer system, then convert the resultation data into results display data, then display results using the results display data on the second display device, then receive the final address selection data from the second user using the second set of one or more input devices, then transmit the final address selection data to the third computer system, then receive the second final address data and the second content data stream display data from the third computer system, then display a second provider page on the second display device using the second final address data, and then display media content on the second provider page using the second content data stream display data;

determine the geographic element data and then transmit the geographic element data to the third computer system;

receive the element display data from the third computer system, then display the element set on the second display device, receive the element selection from the second user using the second set of one or more input devices, then transmit the element selection to the third computer system, then receive the second non-final address data from the third computer system, then display an eighth set of one or more addresses on the second display device using the second non-final address data, then receive the address selection from the second user using the second set of input devices, then transmit the address selection to the third computer system; and receive the direction entry from the second user using the second set of one or more input devices and then transmit the direction entry to the third computer system.

2. A system including a first computer system, a second computer system, and a third computer system, the first computer system comprising a first processor, a first computer storage memory, a first set of one or more input devices, and a first display device, the second computer system comprising a second processor, a second computer storage memory, a second set of one or more input devices, and a second display device, the third computer system comprising a third processor and a third computer storage memory, the first computer system operated by a first user, the second computer system operated by a second user, the first computer system, the second computer system, and the third computer system connected to a network of one or more computer systems;

the third processor programmed to: save a first set of one or more addresses to the third computer storage memory, access a second set of one or more addresses from the third computer storage memory, and determine whether a third set of one or more addresses are in final form or non-final form;

create a provider account for the first user, create a first final address using element data, associate the first final address to a first provider page, and assign the first final address to a first non-final address;

the first processor programmed to: receive content data from the first user using the first set of one or more input devices and transmit the content data to the third computer system;

the third processor additionally programmed to: receive the content data from the first computer system and convert the content data into a first content data stream;

create a viewer account for the second user;

the second processor programmed to: receive an entry from the second user using the second set of one or more input devices and transmit the entry to the third computer system;

the third processor additionally programmed to: receive the entry from the second computer system and determine if the entry is address signifier inclusive;

if the entry is determined to be address signifier inclusive, determine an address signifier type;

if the address signifier type is determined to be a final address signifier type, identify an element set for the entry, determine element matching for the entry using the element set, and if the entry and the first final address are determined to be element matching, transmit the first content data stream to the second computer system;

if the address signifier type is determined to be a non-final address signifier type, identify the element set for the entry, determine element matching for the entry using the element set, and if the entry and the first non-final address are determined to be element matching, transmit first the non-final address to the second computer system; and if element matching for the entry is not determined, convert the address signifier type.

3. The system in claim 2, the third processor further programmed to: determine geographic element inclusion, and if geographic element inclusion is determined, then determine element matching for the entry using one or more geographic elements from the entry.

4. The system in claim 2, the third processor further programmed to: determine subject element inclusion, and if subject element inclusion is determined, then determine element matching for the entry using one or more subject elements from the entry.

5. The system in claim 2, the third processor further programmed to: determine arbitrary element inclusion, and if arbitrary element inclusion is determined, determine element matching for the entry using one or more arbitrary elements from the entry.

6. The system in claim 2, the third processor further programmed to: determine element matching between the entry and the second set of one or more addresses.

7. The system in claim 6, the third processor further programmed to: create resultation data using element matching data and transmit the resultation data to the second computer system.

8. The system in claim 7, the second processor further programmed to: receive the resultation data from the third computer system, display results using the resultation data on the second display device, receive a final address selection from the second user using the second set of one or more input devices, transmit the final address selection to the third computer system, and the third processor further programmed to: receive the final address selection from the second computer system, identify a second final address using the final address selection, and transmit a second content data stream using the second final address to the second computer system.

9. The system in claim 2, the second processor further programmed to: receive the first content data stream from the third computer system, display the first content data stream, receive the first non-final address from the third computer system, and display the second set of one or more addresses on the second display device using the first non-final address.

10. The system in claim 8, the second processor further programmed to: receive the second final address and the second content data stream from the third computer system and display the second content data stream on the second display device.

11. The system in claim 2, the third processor further programmed to: transmit element display data to the second computer system, receive an element selection from the second computer system, identify a fourth set of one or more addresses using the element selection, receive an address selection from the second computer system, and transmit second non-final address data to the second computer system.

12. The system in claim 11, the second processor further programmed to: receive the element display data from the third computer system, display the element set on the second display device, receive the element selection from the second user using the second set of one or more input devices, transmit the element selection to the third computer system, receive the second non-final address from the third computer system, display a fourth set of addresses on the second display device using the second non-final address, receive the address selection from the second user using the second set of input devices, transmit the address selection to the third computer system.

13. The system in claim 2, the third processor further programmed to: receive a direction entry from the second computer system; if the direction entry is in a first direction, transmit a second final address and a second content data stream to the second computer system, and if the direction entry is in a second direction, transmit a third final address and a third content data stream to the second computer system.

14. The system in claim 13, the second processor further programmed to: receive the direction entry from the second user using the second set of one or more input devices and transmit the direction entry to the third computer system.

15. The system in claim 2, the second processor further programmed to: determine the geographic element data and transmit the geographic element data to the third computer system; the third processor further programmed to: receive the geographic element data from the second user and identify a fourth set of one or more addresses using the geographic element data.

16. A system including a first computer system, a second computer system, and a third computer system, the first computer system comprising a first processor, a first computer storage memory, a first set of one or more input devices, and a first display device, the second computer system comprising a second processor, a second computer storage memory, a second set of one or more input devices, and a second display device, the third computer system comprising a third processor and a third computer storage memory, the first computer system operated by a first user, the second computer system operated by a second user, the first computer system, the second computer system, and the third computer system connected to a network of one or more computer systems;

the third processor programmed to: save a first set of one or more addresses to the third computer storage memory and access a second set of one or more addresses from the third computer storage memory;

create a first final address using element data, associate the first final address with a first non-final address, and associate a first content data stream with the first final address;

receive a entry from the second computer system, and determine if the entry is address signifier inclusive;

if the entry is determined to be address signifier inclusive, determine an address signifier type;

if the address signifier type is determined to be a final address signifier type, identify an element set for the entry, determine element matching for the entry using the element set, and if the entry and the first final address are determined to be element matching, transmit the first content data stream to the second computer system; and if the address signifier type is determined to be a non-final address signifier type, identify the element set for the entry, determine element matching for the entry using the element set, and if the entry and the first non-final address are determined to be element matching, transmit the first non-final address to the second computer system.

17. The system in claim 16, the third processor further programmed to: if element matching for the entry is not determined, convert the address signifier type.

18. The system in claim 16, the third processor further programmed to: if the entry is determined to be address signifier noninclusive, then: determine element matching for the entry using one or more arbitrary elements from the entry, create resultation data using element matching data and transmit the resultation data to the second computer system.

19. The system in claim 18, the third processor further programmed to: receive a final address selection from the second computer system and transmit a second content data stream to the second computer system.

20. The system in claim 16, the third processor further programmed to: receive geographic element data from the second user and identify a third set of one or more addresses using the geographic element data.

* * * * *